United States Patent [19]

Kalman

[11] Patent Number: 4,476,424

[45] Date of Patent: Oct. 9, 1984

[54] VARIABLE SPEED INDUCTION MOTOR DRIVE SYSTEM

[75] Inventor: Gabor Kalman, Palos Verdes, Calif.

[73] Assignee: The Garrett Corporation, Los Angeles, Calif.

[21] Appl. No.: 374,375

[22] Filed: May 3, 1982

[51] Int. Cl.³ .............................................. H02P 5/40
[52] U.S. Cl. .................................... 318/832; 318/737
[58] Field of Search ............... 318/732, 737, 823, 827, 318/754, 703, 809, 803, 826, 332, 730, 44; 323/201–205, 207; 363/71, 72

[56] References Cited

U.S. PATENT DOCUMENTS 3,696,278 10/1972 Kuniyoshi et al. ................. 318/778
3,753,069 8/1973 Newton .............................. 318/778

Primary Examiner—David Smith, Jr.
Attorney, Agent, or Firm—James R. Brueggemann; Leslie S. Miller; James W. McFarland

[57] ABSTRACT

A variable speed induction motor drive system operating at a leading power factor. A prescribed reactive power is coupled to the motor's rotor, to permit line commutation of an inverter supplying the motor's stator, and to permit the inverter to be supplied by a substantially constant dc link voltage.

7 Claims, 6 Drawing Figures

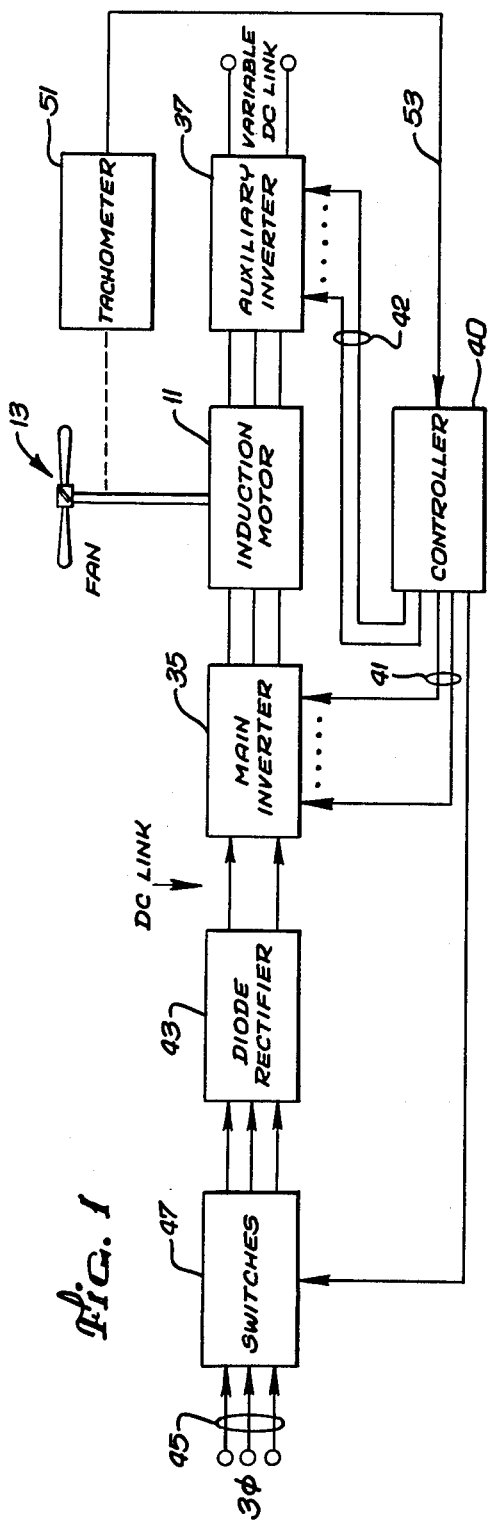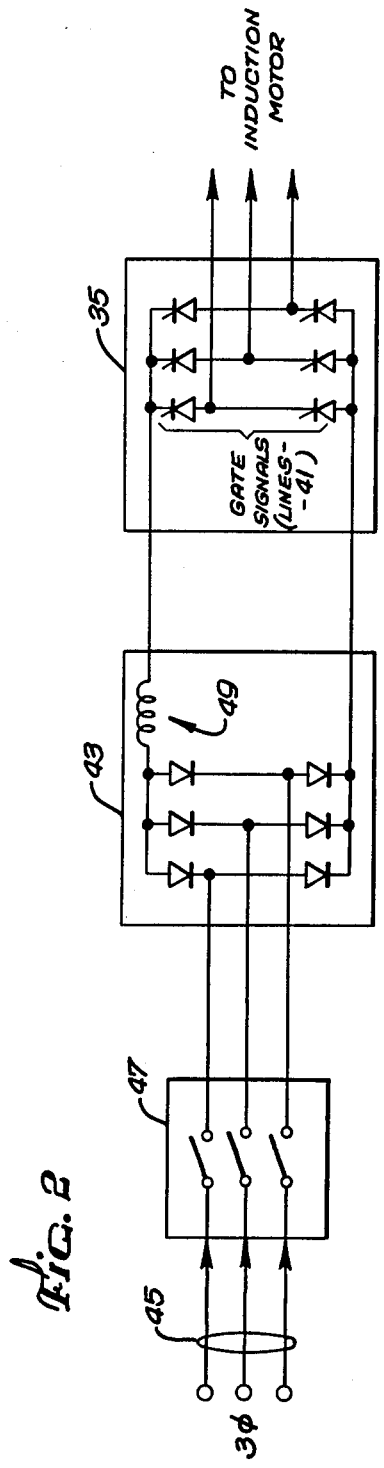

VARIABLE SPEED INDUCTION MOTOR DRIVE SYSTEM

BACKGROUND OF THE INVENTION

This invention relates generally to variable speed rotating electrical machinery, and more particularly to variable speed induction motor drive systems operating at a leading power factor.

An example of an induction motor drive system of this particular type is provided in a copending application, Ser. No. 331,108, entitled "Leading Power Factor Induction Motor Drive", filed Dec. 15, 1981 in the names of Gabor Kalman et al. The application describes an induction motor drive system including a main machine and a smaller auxiliary machine, installed in a common housing. The rotors of the two machines are mounted on a common shaft, and both rotors have a squirrel-cage construction. The rotor bars of the main machine and of the auxiliary machine are concatenated at their adjoining ends and are connected to conventional end rings at their extremities. The main machine is supplied from a line-commutated inverter, and the auxiliary machine is supplied from a separate, forced-commutated inverter. The two inverters are supplied by separate variable dc link voltage sources, such as controlled rectifiers or chopper-type input inverters.

AC induction motors typically operate at a lagging power factor, and are therefore inherently incompatible with line-commutated inverters, which function properly only if they supply a leading power factor load. A static inverter that is capable of supplying lagging power factor loads must have auxiliary circuitry to force the communication of its solid state switching devices. This auxiliary circuitry makes such a forced-commutated inverter significantly more expensive than a line-commutated inverter of comparable power rating.

In the induction motor drive system described in the aforementioned copending application, the forced-commutated inverter for the auxiliary machine is specially configured such that the stator of the main machine appears to have a leading power factor. In particular, the frequency and voltage levels of the ac signals supplied by the forced-commutated inverter to the auxiliary stator are coupled through the respective auxiliary and main rotors to the main stator, causing its current to lead its voltage. This permits the use of a line-commutated inverter to drive the main machine, thereby providing a significant cost savings for a machine of a given size.

The induction motor drive system described in the aforementioned copending application produces a high starting torque and is suitable for use in applications requiring power ratings of up to several hundred horsepower. Also, its use of a line-commutated inverter in place of a forced-commutated inverter provides a significant cost savings over known prior systems. However, that is a need for even further cost savings in some situtations, such as where the system's starting torque need not be particularly high. The present invention fulfills this need.

SUMMARY OF THE INVENTION

The present invention is embodied in a variable speed induction motor drive system that includes an induction motor operating at a leading power factor. In accordance with the invention, the drive system includes means for providing a prescribed reactive power to the induction motor's rotor, to permit line commutation of an inverter supplying the motor's stator, and to permit the inverter to be supplied by a substantially constant dc link voltage. The invention thereby provides a substantial cost savings over known prior variable speed systems of this type, which achieve line commutation of their inverters only by using a dc link voltage that is variable.

More particularly, the variable speed induction motor drive system includes a main machine and a smaller auxiliary machine, installed in a common housing. The rotors of the two machines are mounted on a common shaft and both have a squirrel-cage construction. The rotor bars of the main machine and of the auxiliary machine are concatenated at their adjoining ends and are connected to conventional end rings at their extremities. The line-commutated inverter supplies the main machine's stator, and a separate forced-commutated inverter supplies the auxilliary machine's stator. A diode rectifier, supplied by an ac line through a set of switches, supplies the substantially constant dc link voltage to the line-commutated inverter. A controller adjusts the forced-commutated inverter to supply an ac signal having a selectable frequency and voltage level, such that the prescribed reactive power is coupled through the respective auxiliary and main rotors to the main stator. This causes the main stator to appear to constitute a leading power factor load, and permits the use of a line-commutated inverter supplied from a substantially constant dc link voltage.

To accelerate the drive system from a standstill to its minimum operating speed, the switches coupling the ac line to the diode rectifier are opened and the switching elements, e.g., thyristors, in the line-commutated inverter are gated on continuously. This effectively shorts the main motor circuit through the line-commutated inverter—dc link—diode rectifier path, and the motor then operates like a conventional squirrel-cage induction machine fed through the forced-commutated inverter. Since, in the case of fan-type loads, the power requirement even at half-speed is less than 15 percent of the maximum rating, the forced-commutated inverter need not have a capacity that is particularly large in comparison to that of the line-commutated inverter.

After the motor drive system reaches its minimum operating speed, the switches coupling the ac voltage source to the diode rectifier are closed and the constant dc link voltage is thereafter supplied to the line-commutated inverter. The controller then controllably varies the specific frequency and voltage level of the ac signal supplied by the forced-commutated inverter to the auxiliary stator, such that the motor drive system operates at a selected speed.

In an alternative embodiment of the invention, the motor drive system includes a plurality of machines, each having a main machine with a main stator and a main rotor and an auxiliary machine with an auxiliary stator and an auxiliary rotor. A separate forced-commutated inverter supplies current to each auxiliary stator, and a single line-commutated inverter, supplied by a substantially constant dc link voltage, drives all of the main stators in parallel.

Other aspects and advantages of the present invention should become apparent from the following description of the preferred embodiments, taken in con-

BRIEF DESCRIPTION OF THE DRAWINGS

FIG. 1 is a simplified block diagram of a variable speed, leading power factor induction motor drive system embodying the present invention;

FIG. 2 is a simplified schematic diagram of the switches, diode rectifier and line-commutated inverter portion of the drive system of FIG. 1;

DESCRIPTION OF THE PREFERRED EMBODIMENTS

Figure 5:
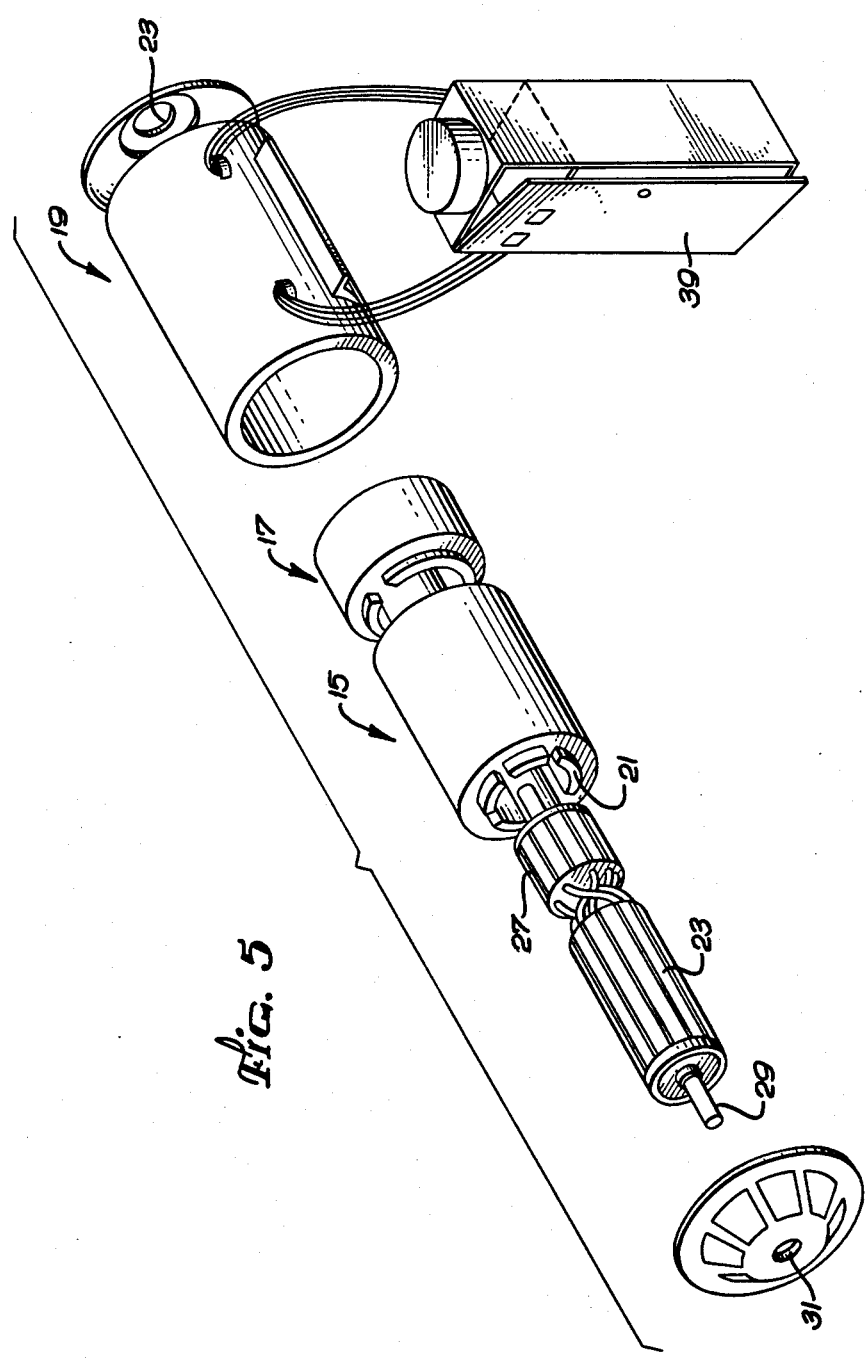
FIG. 5 is an exploded prespective view of a portion of the motor drive system depicted in FIG. 1.

Referring now to the drawings, and particularly to FIG. 1, there is shown a simplified block diagram of a variable speed induction motor drive system embodying the present invention, including an induction motor 11 driving a load such as a fan 13. FIG. 5 is an exploded perspective view of the motor, showing it to include a main machine 15 and an auxiliary machine 17, installed in a common housing 19. The main machine includes a three-phase main stator assembly 21 and a main rotor assembly 23, preferably of a squirrel-cage construction, and the auxiliary machine likewise includes a three-phase auxiliary stator assembly 25 and an auxiliary rotor assembly 27, also preferably of a squirrel-cage construction. The main rotor assembly and the auxiliary rotor assembly are mounted on a common rotor shaft 29, which is rotatably mounted within the housing by end bells 31 and 33.

Referring again to FIG. 1, a main inverter 35 supplies three-phase electrical power to the main stator assembly 21, and an auxiliary inverter 37 supplies three-phase electrical power to the auxiliary stator assembly 25. The two inverters, which are located within an inverter housing 39 (FIG. 5), both include a plurality of thyristers that are gated on at appropriate times, to commutate the dc link voltages supplied to them. In particular, a controller 40 couples appropriate gating signals over lines 41 and 42 to the main and auxiliary inverters, respectively, to controllably adjust the frequencies and voltage levels of the ac signals they supply. This effects the prescribed motor speed control.

An induction motor such as the main machine 15 inherently operates at a lagging power factor, and is therefore ordinarily incompatible with a line-commutated inverter, which can drive only leading power factor loads. However, as described more fully in the aforementioned copending application, Ser. No. 331,108, which is incorporated by reference into this application, the main machine can be made to be compatible with a line-commutated inverter by coupling the appropriate reactive power to it via the auxiliary machine 17.

In the induction motor drive system described in the aforementioned application, a variable speed is achieved by controllably varying the frequencies and the voltage levels of the ac signals supplied by the main inverter and the auxiliary inverter. This ordinarily requires the use of two separate phase-delay rectifiers for supplying dc link voltages that are variable, thereby adding to the system's complexity and cost. This added complexity and cost is believed to be unnecessary in situations not requiring a high starting torque, such as in an induction motor drive system for driving a fan-type load.

In accordance with the invention, the controller 40 controllably adjusts the frequency and voltage of the ac signal supplied by the auxiliary inverter 37 and controllably adjusts the frequency of the ac signal supplied main inverter 35, such that the main inverter can be line-commutated and supplied by a dc link having a substantially constant voltage. This eliminates the need for a relatively complex and costly phase-delay rectifier for supplying a dc link voltage that is variable. Although the drive system of the invention provides a starting torque somewhat reduced from that which can be achieved using a variable dc link voltage, the system is suitable for use in driving many loads, such as fan-type loads.

Referring now to both FIGS. 1 and 2, the constant dc link voltage supplied to the main inverter 35 is produced by a diode rectifier 43, which in turn is supplied from a three phase power line 45 via a set of electrical switches 47. The diode rectifier includes an inductor 49 following its diodes, to reduce the ripple in the rectified voltage signal.

Figure 3:
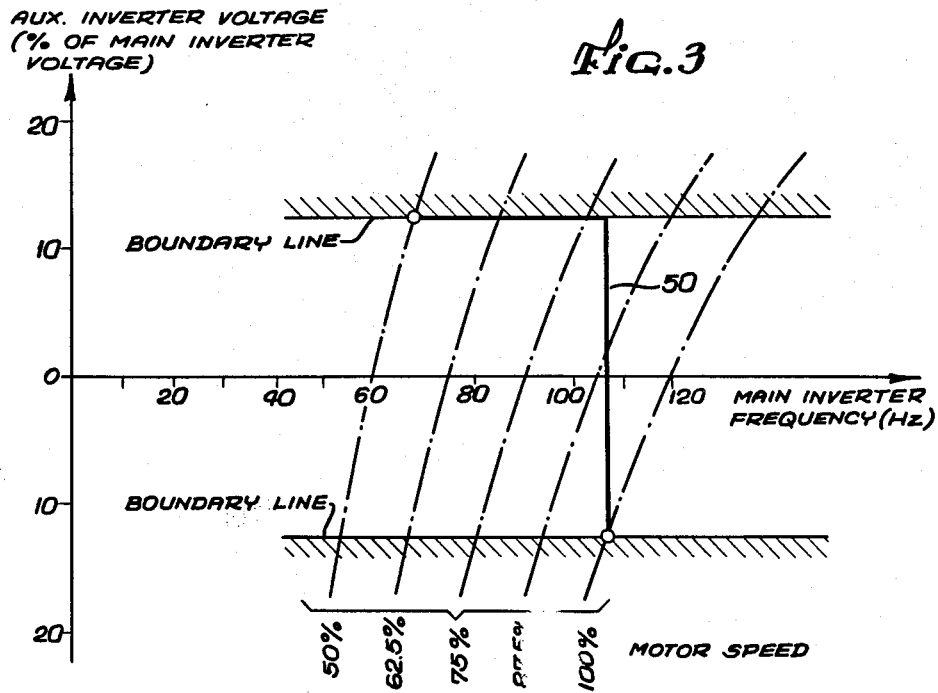
FIG. 3 is a graph depicting the relationship between the main inverter frequency and the auxiliary inverter voltage for a set of fixed motor speeds ranging from 50 percent to 100 percent of maximum speed.
Figure 4:
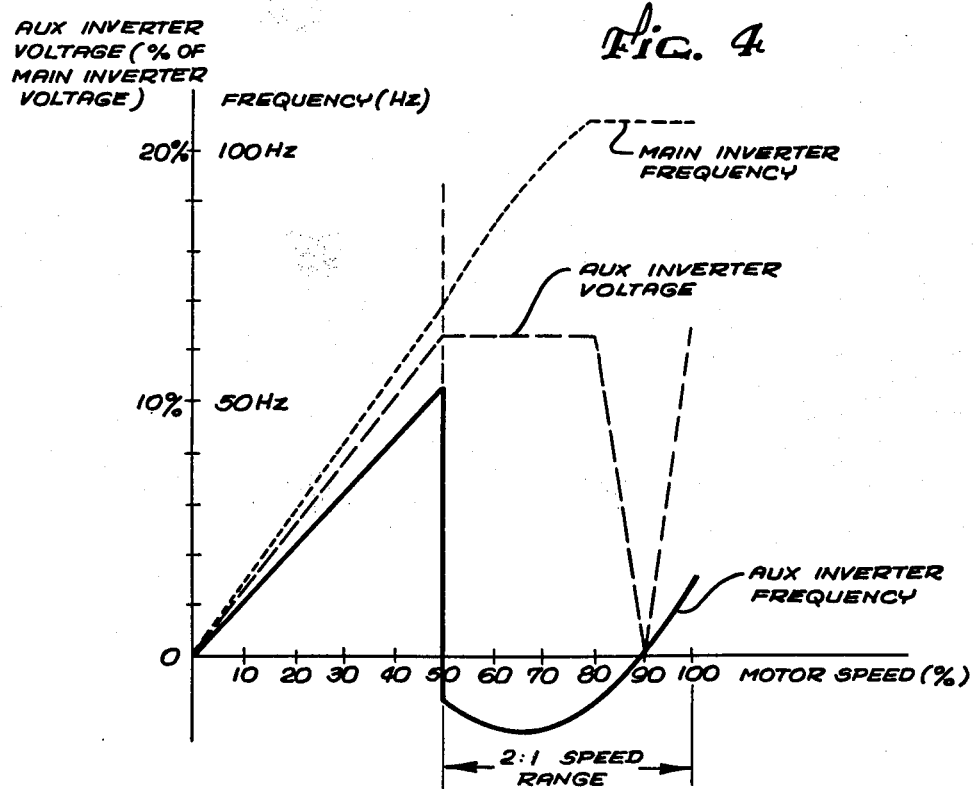
FIG. 4 is a graph depicting the voltage and frequency of the auxiliary inverter and the frequency of the main inverter for the entire range of motor speeds.

FIGS. 3 and 4 depict the prescribed relationships between the voltages and frequencies of the respective main and auxiliary inverters 35 and 37, as a function of motor speed. FIG. 3 in particular depicts the relationship between main inverter frequency and auxiliary inverter voltage, for a set of fixed motor speeds ranging from 50 percent to 100 percent of maximum speed. In the graph, the auxiliary inverter voltage is expressed as a percentage of the main inverter voltage. Boundaries for the auxiliary inverter voltage of plus and minus 12.5 percent of the main inverter's voltage are included in the figure, to indicate arbitrary limits imposed to limit the auxiliary inverter's rating. The locus of both the main inverter's frequency and the auxiliary inverter's voltage is indicated by a heavy solid line 50, for a 2:1 speed range.

FIG. 4 depicts the prescribed values for the frequency of the main inverter 35 and for the frequency and voltage of the auxiliary inverter 37, for motor speeds ranging from zero to 100 percent of maximum speed. The curves for the main inverter's frequency and the auxiliary inverter's voltage, for motor speeds of 50 to 100 percent, are derived from the locus 50 in FIG. 3.

Thus, when it is desired that the induction motor drive system operate at a prescribed speed between 50 and 100 percent of its maximum speed, the controller 40 controllably adjusts the frequency of the main inverter 35 and the frequency and voltage level of the auxiliary inverter 37 to correspond to the values indicated by the graph of FIG. 4. For example, if a speed equal to about 60 percent of the drive system's maximum speed is desired, the controller controllably adjusts the main inverter's frequency to be about 84 Hz, the auxiliary inverter's frequency to be about negative 15 Hz, and the auxiliary inverter's voltage to be about 12.5 percent that of the main inverter. In this context, a negative frequency simply means that the three phases are switched in a sequence ACB, rather than ABC.

To accelerate the induction motor drive system from a standstill to its minimum operating speed, i.e., 50 percent of its maximum speed, the controller 40 opens the set of switches 47, as shown in FIG. 2, and gates on continuously the thyristers in the main inverter 35. This in effect shorts the main machine 15 via the main inverter and the diode rectifier 43. At this time, the auxiliary inverter 37 supplies power to the auxiliary machine 17, which operates like a conventional squirrel-cage induction motor. Since in the case of fan-type loads the power requirement, even at half-speed, is ordinarily less than about 15 percent of its maximum rating, the auxiliary inverter has sufficient capacity to accelerate the motor to this speed. When the drive system reaches its minimum operating speed of 50 percent of its maximum speed, the controller closes the switches and controllably adjusts the main inverter and the auxiliary inverter, as indicated by the graph of FIG. 4, discussed above.

In the brake mode, the controller 40 again opens the set of switches 47, shorting the main machine 15 and thereby preventing the drive system from regenerating through the main inverter 35. The auxiliary inverter 37 handles all of the power up to its capacity.

Referring again to FIG. 1, the motor drive system further includes a tachometer 51 for monitoring the speed of the motor-driven fan 13 and coupling a signal representative of that speed over line 53 to the controller 40. This permits the controller to achieve a more accurate control of the motor speed.

Figure 6:
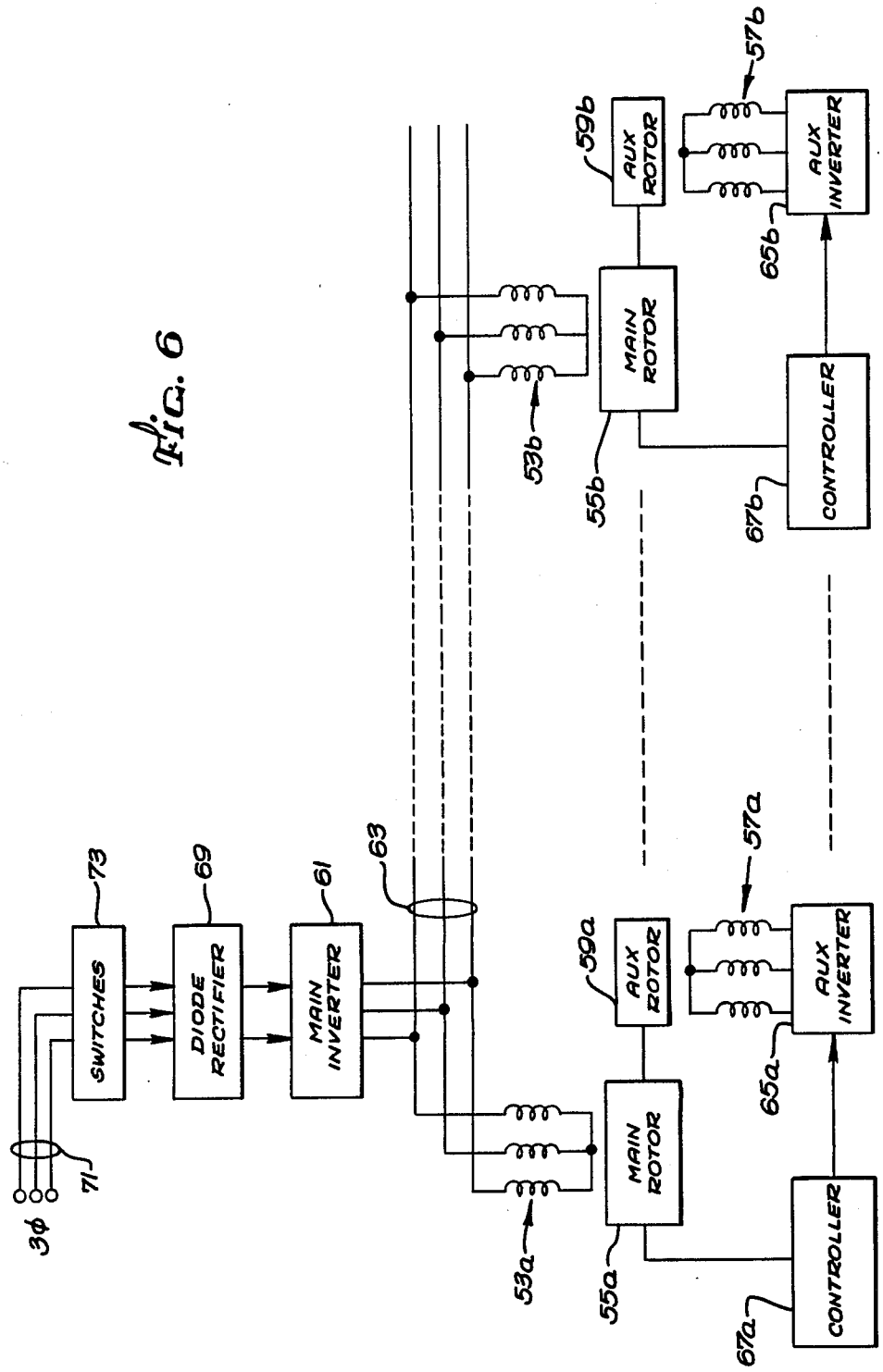
FIG. 6 is a simplified schematic diagram of an alternative embodiment of the invention, which includes a plurality of separately controlled machines.

FIG. 6 depicts an alternative embodiment of the invention, which includes a plurality of separate motor drive systems. Each system is similar to the motor drive system described above with references to FIGS. 1-5. A first motor drive system includes a main machine having a three phase main stator 53a and a corresponding main rotor 55a, and an auxiliary machine having a three phase auxiliary stator 57a and a corresponding auxiliary rotor 59a. A main inverter 61 supplies three phase power over a power line 63 to the main stator, and an auxiliary inverter 65a provides three phase power to the auxiliary stator. A controller 67a connected between the main rotor and the auxiliary inverter regulates the frequency and voltage level of the ac signal supplied by the auxiliary inverter, such that a prescribed reactive power is coupled through the respective rotors to the main stator. This permits the main inverter to be line-commutated and to be supplied by a substantially constant dc link voltage. The dc link voltage is supplied to the main inverter by a diode rectifier 69, which in turn is connected to a three-phase power line 71 through a set of electrical switches 73.

Like the first motor drive system, a second system includes a main machine having a main stator 53b and a main rotor 55b, and an auxiliary machine having an auxiliary stator 57b and an auxiliary rotor 59b. A controller 67b connected between the main rotor and an auxiliary inverter 65b regulates the frequency and voltage level of the ac signal the auxiliary inverter supplies to the auxiliary stator. The main stator is supplied with three-phase power over the power line 63 from the main inverter 61.

A plurality of additional machines (not shown) can likewise be connected to the main inverter 61 in the manner described above. The invention makes it possible to control the speed of the respective rotors without altering the main inverter frequency, by changing the frequency and voltage level of each auxiliary inverter's ac output, to achieve a desired slip.

It should be appreciated from the foregoing description that the present invention provides an improved induction motor drive system that can operate over a wide speed range. A prescribed reactive power is coupled to the motor's rotor, to permit line commutation of an inverter supplying the motor's stator, and to permit the inverter to be supplied by a substantially constant dc link voltage.

Although the present invention has been described in detail with reference to the presently preferred embodiments, it should be understood by those of ordinary skill in the art that various modifications can be made without departing from the invention. Accordingly, the invention is limited only by the appending claims.

I claim:

1. A variable speed motor drive system comprising:
    a machine housing;
    a main machine mounted within said machine housing, said main machine including a main stator assembly and a main rotor assembly;
    a main inverted connected to said main stator assembly for supply electric current at a constant voltage level thereto;
    supply means connected to said main inverter for supplying a substantially constant dc voltage thereto;
    an auxiliary machine mounted within said machine housing, said auxiliary machine including an auxiliary stator assembly and an auxiliary rotor assembly, said auxiliary rotor assembly being connected to said main rotor assembly to permit electric current to flow therebetween;
    an auxiliary inverter connected to said auxiliary stator for supplying electric current at a variable voltage level thereto, whereby an electric current is induced in said auxiliary rotor, said induced current flowing from said auxiliary rotor assembly to said main rotor assembly to produce a voltage for line-commutating said main inverter; and
    means for controlling the speed of said motor drive system by simultaneously varying the frequency of operation of said main inverter, the frequency of operation of said auxiliary inverter, and the voltage level of said auxiliary inverter while maintaining the voltage level of said main inverter at a constant level.

2. An induction motor drive system as defined in claim 1, wherein said supply means includes:
    an ac voltage source; and
    a diode rectifier connected to said ac voltage source, for rectifying the ac voltage to produce the substantially constant dc voltage.

3. An induction motor drive system as defined in claim 1, wherein:
    said main rotor assembly and said auxiliary rotor assembly are squirrel-cage rotors;
    said main inverter is a line-commutated inverter; and
    said auxiliary inverter is a forced-commutated inverter.

4. An induction motor drive system as defined in claim 3, and further including switch means for disabling said supply means during startup of the induction motor drive system, until the main rotor assembly has reached a speed greater than a prescribed percentage of its maximum speed.

5. A variable speed induction motor drive system comprising:
   a main inverter for operation at a constant voltage level;
   supply means connected to said main inverter for supplying a substantially constant dc voltage thereto;
   a plurality of main machines each including a main stator and a main rotor, each of said main stators being connected to said main inverter in parallel with one another;
   a plurality of auxiliary machines, each auxiliary machine having an auxiliary stator and an auxiliary rotor, and each auxiliary machine corresponding to a separate main machine, with corresponding main rotors and auxiliary rotors being connected together to permit electrical current to flow therebetween;
   a plurality of auxiliary inverters, each being connected to separate auxiliary stator, to supply electric current at a variable voltage level thereto; and
   a plurality of controllers to controllably adjust the frequencies and voltages of the ac signals supplied by the auxiliary inverters and the frequency of said main inverter and thereby controllably adjust the speeds of the corresponding main rotors.

6. A method for driving an induction motor at a controllably variable speed, comprising steps of:
   mounting a main rotor assembly and an auxiliary rotor assembly on a common shaft;
   supplying a substantially constant dc link voltage to a line-commutated inverter;
   connected the line-commutated inverter to supply a constant voltage, variable frequency current to a main stator assembly, to induce current in, and thereby develop torque for rotating, the main rotor assembly;
   supplying variable voltage, variable frequency electric current from a forced-commutated inverter to an auxiliary stator assembly, to induce current in, and thereby torque for rotating, the auxiliary rotor assembly, and
   connecting the main rotor assembly and the auxiliary rotor assembly together to permit electric current to flow therebetween, the current induced in the auxiliary rotor assembly providing a prescribed relative power to the main rotor assembly to ensure line commutation of the line-commutated inverter.

7. A method as defined in claim 6, and further including a step of controllably adjusting the frequency of the ac signal supplied by the line-commutated inverter and the frequency and voltage of the ac signal supplied by the forced-commutated inverter, such that the main rotor assembly is selectively rotatable over a range of speeds.

* * * * *